(12) United States Patent
Gang

(10) Patent No.: US 7,661,171 B2
(45) Date of Patent: Feb. 16, 2010

(54) RAMP WITH VEHICLE ATTACHMENT

(75) Inventor: Wang Gang, Shanghai (CN)

(73) Assignee: Central Purchasing LLC, Camarillo, CA (US)

( * ) Notice: Subject to any disclaimer, the term of this patent is extended or adjusted under 35 U.S.C. 154(b) by 0 days.

(21) Appl. No.: 12/014,620

(22) Filed: Jan. 15, 2008

(65) Prior Publication Data

US 2009/0178214 A1 Jul. 16, 2009

(51) Int. Cl.
*E01D 1/00* (2006.01)
(52) U.S. Cl. .......................... 14/69.5; 296/61
(58) Field of Classification Search ................. 14/69.5; 296/61
See application file for complete search history.

(56) References Cited

U.S. PATENT DOCUMENTS

| | | | | |
|---|---|---|---|---|
| 3,190,393 | A * | 6/1965 | Alfano | 182/194 |
| 3,730,295 | A * | 5/1973 | Deese | 182/163 |
| 3,949,836 | A * | 4/1976 | Russo | 182/194 |
| D246,449 | S * | 11/1977 | Poe | D34/32 |
| 4,334,338 | A * | 6/1982 | Conn | 16/266 |
| 4,376,470 | A * | 3/1983 | Ashton | 182/23 |
| 4,421,300 | A | 12/1983 | Lundman | |
| 4,478,549 | A * | 10/1984 | Stelly et al. | 414/537 |
| 4,668,002 | A | 5/1987 | Hanson | |
| D297,064 | S * | 8/1988 | Ball et al. | D34/32 |
| D299,776 | S * | 2/1989 | Canterberry | D34/32 |
| 4,875,547 | A * | 10/1989 | Hanthorn | 182/102 |
| 5,287,579 | A * | 2/1994 | Estevez, Jr. | 14/71.1 |
| 5,400,733 | A * | 3/1995 | Richter | 114/258 |
| 5,538,308 | A | 7/1996 | Floe | |
| 5,926,889 | A | 7/1999 | Riesselmann et al. | |
| 6,119,634 | A * | 9/2000 | Myrick | 119/847 |
| 6,430,769 | B1 * | 8/2002 | Allen | 14/69.5 |
| 6,623,224 | B2 * | 9/2003 | Schrader | 410/97 |
| 6,837,669 | B2 | 1/2005 | Reed et al. | |
| D505,238 | S | 5/2005 | Robertson | |
| 7,013,518 | B2 * | 3/2006 | Leblanc | 14/69.5 |
| 7,077,616 | B2 | 7/2006 | Wagner | |
| 7,299,517 | B1 * | 11/2007 | Adinolfe | 14/69.5 |
| 7,308,726 | B2 * | 12/2007 | Schomaker et al. | 14/69.5 |
| 7,310,842 | B2 * | 12/2007 | Frahm et al. | 14/69.5 |
| 7,526,826 | B2 * | 5/2009 | Bailie | 14/69.5 |

* cited by examiner

*Primary Examiner*—Raymond W Addie
(74) *Attorney, Agent, or Firm*—Sills Cummis & Gross P.C.

(57) ABSTRACT

The present invention relates to a ramp. The ramp includes at least two stiles. Each stile has a top, a bottom and four sides. A plurality of shoulders are equally spaced apart and mounted on one side of each stile. A plurality of rungs are aligned with the shoulders. Each rung has a right end, a left end and four sides. A plurality of notches are located on the right end and left end of each rung. The number of shoulders equals the number of the notches and the shoulders and notches are tightly fitted together to form the ramp.

7 Claims, 2 Drawing Sheets

RAMP WITH VEHICLE ATTACHMENT

BACKGROUND OF THE INVENTION

1. Field of the Invention

The present invention relates to a ramp. Specifically, the present invention relates to a light-weight and durable ramp that attaches to a vehicle.

2. Prior Art

The use of pick-up trucks and other light-weight vehicles for personal and commercial transport of heavy items has existed for some time. The problem that occurs with these small vehicles is that loading heavy items onto the truck bed can be often difficult if not impossible. The problem is only heightened if a person is working alone.

In some larger vehicles, electromechanical lifts are installed on the vehicle. These lifts allow a platform to be lowered to ground level. Items are then loaded onto the platform. Once loaded, the platform is then lifted to the height of the truck bed. The problem with these lifts is that they are expensive and cumbersome, especially, if the vehicle is used as personal transport.

Larger trucks, such as moving trucks, offer a ramp that is stored vertically under the bed of the truck. These ramps are often very long and heavy and need a large amount of storage space. Because of the storage needed, these ramps cannot be used for smaller vehicles.

Over the years different designs for ramps for use with small pick-up trucks were contemplated. One ramp is constructed having cross members that intersect with elongate members. These members are held against each other using a channel located along a length of the elongate member with the cross members sitting within the channel. The problem associated with these ramps is that if the item to be transported across the ramp is over a certain weight, the cross members will apply a large force onto the channel thereby causing the channel will bend. Once bent, the cross members will disengage from the channel resulting in grave injury to the user and/or the destruction of the item being moved.

Therefore, there is significant commercial interest in the fabrication of light-weight and durable ramp having a high weight-bearing capacity.

SUMMARY OF THE INVENTION

To overcome the short-comings of the prior art, the ramp of the present invention offers a light-weight and durable ramp for attachment to many pick-up trucks and other light-weight vehicles with an added benefit of having a high-weight bearing capacity.

The present invention enhances the weight-bearing capacity of conventional ramps by including a ramp that has a shoulder and notch system. Specifically, the ramp includes at least two stiles and mounted to one side of the stiles is a plurality of shoulders. These shoulders are equally spaced apart along the length of the stile and have a high weight-bearing capacity. The shoulders may be four-sided having a flat top, four-sided shoulder having tapered top and/or may include a nib.

Attached to these shoulders is a plurality of rungs. The rungs are attached to the shoulders via a notch formed on the ends of each rung. The shoulders and notches are tightly fitted together to form the ramp.

In a second embodiment the ramp includes two ramp platforms. Each ramp platform also includes two stiles with each stile having a top, a bottom and four sides. A plurality of shoulders are equally spaced apart and mounted on one side of each stile. A plurality of rungs are aligned with and tightly fitted to the shoulders via notches located on the ends of each rung. The platforms are then movably connected to each other by a set of hinges. During use, the ramp platforms lay adjacent to one another and when not in use, the platforms are folded onto each other.

In a third embodiment, the ramp includes two end stiles and one middle stile with each stile having a top, a bottom and four sides and a plurality of shoulders that are equally spaced apart along one side of the stile with the middle stile having the shoulders on two sides. A plurality of rungs are aligned with the shoulders via a plurality of notches. These notched are located on the right end and left end of each rung. It is worthy to note, that the number of shoulders equals the number of the notches, and each are fitted together to form the ramp.

Other features that may be incorporated into the ramps are ramp extensions for seamlessly connecting to the ramp to a vehicle bed, retention chains for securing the ramp to the vehicle and support fasteners for fixedly holding the rungs and the stiles together.

BRIEF DESCRIPTION OF THE DRAWINGS

These and other features, aspects, and advantages of the apparatus and methods of the present invention will become better understood with regard to the following description and accompanying drawings where.

DETAILED DESCRIPTION OF THE INVENTION

The present invention enhances the characteristics of vehicle ramps buy providing a vehicle ramp that has portability, reliability and safety for use with certain pick-up trucks and other light-weight vehicles. The present invention also substantially increases the weight-bearing capacity of the ramp.

Figure 1:
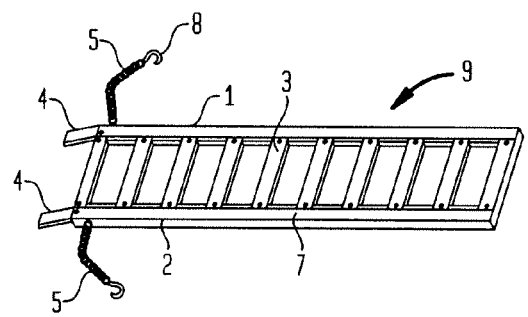
FIG. 1 is a prospective view of a ramp according to a first embodiment of the present invention.

FIG. 1 shows a first embodiment of a vehicle ramp 10 of the present invention. The ramp 10 is formed of stiles 1-2 and rungs 3 that are joined together via a specially designed shoulder and notch system (shown in FIGS. 2a-d).

In the first embodiment, the ramp 10 has two stiles 1-2 and ten rungs 3 but ramps have any number of rungs and stiles are envisioned. The stiles 1-2 and rungs 3 are constructed from elongated extruded aluminum rods but other lightweight materials may be used. Extruded aluminum is used because of its light-weight and durability.

The stiles 1-2 each measure about two to twelve feet in length, 1 to 12 inches in width and 1 to 12 inches in height. The preferred embodiment uses a cubic design for the stiles 1-2 but other designs, such as, cylindrical or elliptical stiles may be used.

Figure 2A:
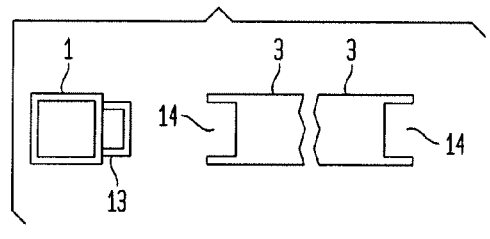
FIGS. 2a-d depict the shoulders and notches according to the present invention.
Figure 2C:
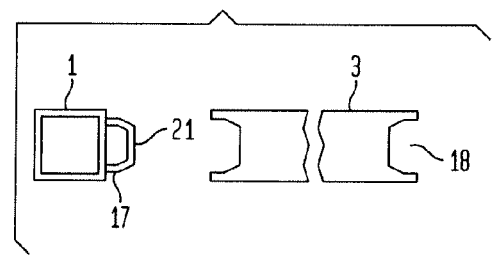
Figure 2B:
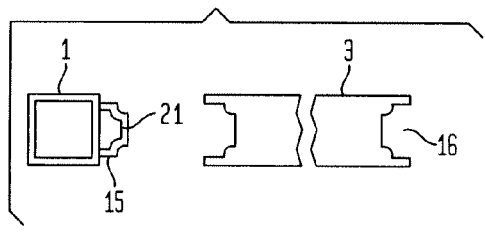
Figure 2D:
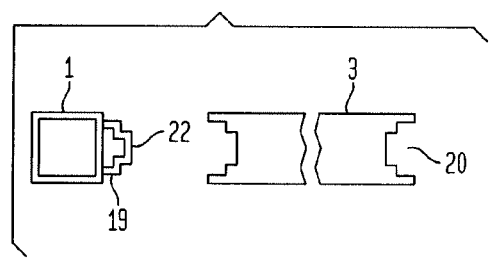

Each stile 1-2 has a top, a bottom and four sides and mounted along one side of each stile 1-2 are shoulders 13 (There are a variety of shoulder types that may be utilized in the present invention as shown in FIGS. 2a-d but for ease of explanation only FIG. 2a will be discussed for the first embodiment). These shoulders 13 are equally spaced along the length of the stiles 1-2 with the shoulders 13 being either welded onto the stiles 1-2 or formed integral with the stiles 1-2 during formation.

The shoulders 13 are made from the same type of extruded aluminum as used for the stiles but other light-weight materials may be used. The main objective of the shoulders 13 is to hold a sufficient amount of weight during normal use of the ramp 10 thereby allowing the ramp 10 to maintain its shape and form. And when in use, the weight of the items to be moved across the ramp 10 is supported mainly by the shoulders 13 thus increasing the weight capacity of the ramp. The shoulders 13 are capable of bearing at least 100-200 lbs each with a combined weight-bearing capacity of at least 500-1500 lbs. The high-weight bearing capacity comes from the type of weld used to adhere the shoulder to the stile and the thickness of the shoulder itself. In the preferred embodiment, the shoulder is a solid body but shoulders having a hollow interior may be used so long as the shoulder is capable of holding a sufficient amount of weight.

As shown in FIGS. 2a-d, the shoulders 13, 15, 17 and 19 may come in many different designs. These designs include but are not limited to a four-sided shoulder having a flat top 13 or a four-sided shoulder that tapers to a flat edge 15. The shoulders may also include a four-sided shoulder having a nib 21, 22 formed at the top. The nib 21, 22 may be four-sided having a flat top 21 or four-sided having tapered top 22. The shoulders designs used in the present invention are not limited to these designs alone and other shoulders design may become apparent from this disclosure.

The vehicle ramp 10 also has a number of rungs 3. These rungs 3 have cubic dimensions measuring about ½ to 2 feet in length, ½ to 6 inches in height and ½ to 6 inches in width. Each rung 3 has a hollowed-out end portion called a notch (shown in FIGS. 2a-d but for ease of explanation only FIG. 2a will be utilized). The notch 14 is designed to have a negating design to that of the shoulder 13 so that the shoulder may fit tightly within the notch.

The rungs 3 and shoulders are spaced along the length of the stiles 1-2 so that there are only a few inches between each rung 3. This helps with the loading of wheeled items. For example, if the ramp 10 is used to put a motorcycle on the bed of the truck, the wheels of the motorcycle will not be lowered into the rung spaces allowing the motorcycle to smoothly move along the ramp.

During manufacture, the shoulders 13 and notches 14 are tightly fitted together and to further ensure the ramp is structurally sound, holes 7 are drilled through the ramp at a near-centered location through the notches 3 and shoulders 13. These holes 7 are aligned during manufacture and fasteners 9 are inserted through the holes 7. These fasteners 9 are then fixedly secured so that the rungs 3 do not disengage from the stiles 1-2 during use.

Another feature that is included on the ramp is a ramp extension 4. These ramp extensions 4 are located at the top end of the stiles 1-2. These extensions 4 make contact with the vehicle and provide a seamless transition for items that are rolled onto and off of the vehicle.

Retention chains 5 are also attached to the ramp 10 and at one end of the chain is a hook 8 or other attachment device. The hooks 8 can be attached to anchor or any other fixed point on the vehicle ensuring the ramp 10 is securely fastened to the vehicle and the ramp will not fall off of the vehicle during use.

The method of using the ramp 10 is simple. The user can easily store the ramp 10 in the vehicle. When needed the user will take the ramp 10 out of its stored position and lay the ramp extensions 4 on the bed of a pick up truck. The user then takes the retention chains 5 and securely fastens the hook 8 to an anchor. Now the ramp 10 is in position for use and a user may roll items along the ramp or the user may carefully walk along the ramp and put items in the bed of the truck. The single style ramp as shown in FIG. 1 is ideal for transport of motorcycles, bicycles and scooters or any other two-wheeled objects.

Figure 3:
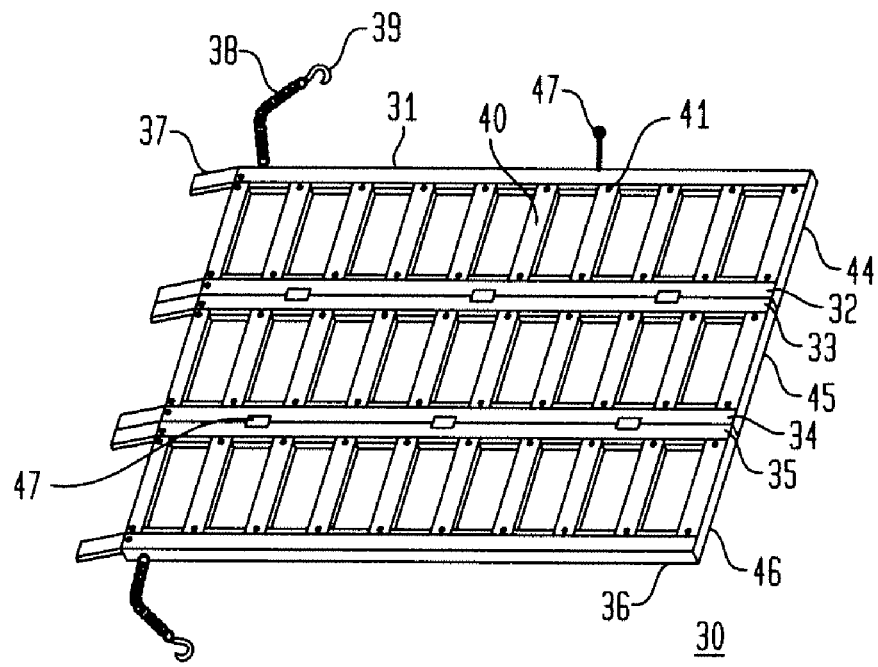
FIG. 3 is a prospective view of a ramp according to a second embodiment of the present invention.

As shown in FIG. 3, a second embodiment is shown for the ramp 30. This ramp 30 includes three ramp platforms 44-46 that can be folded onto to each other when the ramp 30 is not in use. This allows the ramp 30 to triple in size with respect to the first embodiment without the need for a large amount of additional storage space.

Each ramp platform 44-46 includes two set of stiles 31-32, 33-34, 35-36, respectively. These stiles 31-36 are elongated aluminum rods that measure about two to twelve feet in length, 1 to 12 inches in width and 1 to 12 inches in height. The stiles 31-36 are in cubic form but may also be in cylindrical or elliptical form.

Each stile 31-36 has a top, a bottom and four sides and mounted along one side of the stiles 31-36 are shoulders (shown in FIGS. 2a-d but for ease of explanation only FIG. 2a will be utilized). These shoulders 13 are equally spaced from the top to the bottom of the stiles 31-36. The shoulders 13 are either welded onto the stiles 31-36 or formed integral with the stiles 31-36 during formation. The shoulders 13 are made from the same material as the stiles 31-36 but other materials may be used. The main objective of the shoulders 13 is to support a sufficient amount of weight on the ramp during use.

As shown in FIGS. 2a-d, the shoulders 13, 15, 17 and 19 may come in many different designs. These designs include but are not limited to a four-sided shoulder having a flat top 13 or a four-sided shoulder having tapered top that tapers to a flat edge 15. The shoulders may also include a four sided shoulder having a nib 21, 22 formed at the top. The nib 21, 22 may be four-sided having a flat top 21 or four-sided having tapered top that tapers to a flat edge 22. Other shoulders design may become apparent from this disclosure.

The vehicle ramp 30 also has a number of rungs 40. These rungs 40 have cubic dimensions measuring about ½ to 2 feet in length, 1 to 6 inches in height and ½ to 6 inches in width. Each rung 40 has a hollowed-out end portion called a notch (shown in FIGS. 2a-d but for ease of explanation only FIG. 2a will be utilized). The notch 14 is designed to have an opposite design to that of the shoulder 13.

During manufacture, the shoulders 13 and notches 14 are tightly fitted together thereby forming the ramp platforms 44-46. These ramp platforms 44-46 are than set adjacent to each other and held together by a set of hinges 47. The hinges 47 form a movable connection between the platforms 44-46 and allow the ramp platforms 44-46 to be folded onto one another. Any number of ramp platforms may be used depending on the size of the vehicle and the size of the items to be transported.

To further ensure the ramp structurally integrity, holes 41 are drilled through the rungs 40 and shoulders 13. These holes 41 are then aligned and fasteners 47 are secured through the holes 41. These fasteners 47 fixedly secure the rungs 40 to stiles 31-36 and ensure the rungs 40 do not disengage from the stiles during use.

Another feature that is included on the ramp is ramp extensions 37. These ramp extensions 37 are located at the top end of the stiles 31-36. These extensions 37 makes contact with the vehicle and provide a seamless transition for items that are rolled onto and off of the vehicle.

Retention chains 38 are also attached to the ramp 30 and at one end of the chain is a hook 39 or other attachment device.

The hooks 39 can be attached to fixed point on the vehicle ensuring the ramp 30 is securely fastened to the vehicle and the ramp will not fall off of the vehicle during use.

The method of using the ramp 30 of the second embodiment is as follows. The user easily removes the folded ramp 30 from storage within the vehicle and unfolds the ramp. The user then lays the ramp extenders 37 on the bed of a pick up truck. The user then takes the retention chains 38 and securely fastens the chain to anchor points on the truck truck. Now the ramp 40 is in position for use and a user may roll items along the ramp or the user may carefully walk along the ramp and put items in the bed of the truck. The triple-platform ramp 30 is ideal for transport of wider items such as ATV vehicles or sit-on lawn mowers. For very heavy items a four-platform ramp may be used but unfolded so that two platforms may be stacked. This will nearly double the weight capacity of the ramp.

Figure 4:
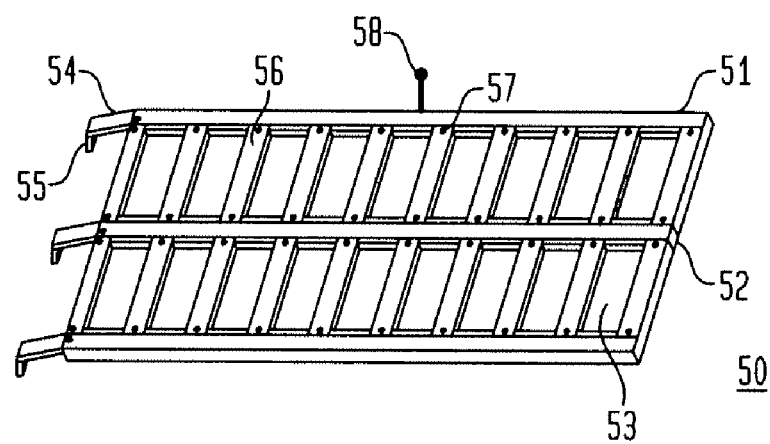
FIG. 4 is a prospective view of a ramp according to a third embodiment of the present invention.

In a third embodiment shown in FIG. 4, the ramp 50 includes two platforms that share a middle stile 52. This ramp 50 cannot be folded and is stored as is.

The ramp 50 of the third embodiment includes three stiles 51-53. These stiles 51-53 are elongated aluminum rods in cubic form. Each stile 51-53 is about two to twelve feet in length, 1 to 12 inches in width and 1 to 12 inches in height. As noted above the stiles 51-53 are in cubic form but may also be in cylindrical or elliptical form as well.

Each stile 51-53 has a top, a bottom and four sides and mounted along one side of the end stiles 51, 53 and along two sides of the middle stile 52 are shoulders 13 (shown in FIGS. 2a-d but for ease of explanation only FIG. 2a will be utilized). These shoulders 13 are equally spaced from the top to the bottom of the stiles 51-53. The shoulders 13 are either welded onto the stiles 51-53 or formed integral with the stile during formation 51-53. The shoulders 13 are made from the same material as the stiles 51-53 but other materials may be used. The main objective of the shoulder 13 is to support a sufficient amount of weight thereby maintaining the composure of the ramp 50 during use.

As shown in FIGS. 2a-d, the shoulders 13, 15, 17 and 19 may come in many different designs. These designs include but are not limited to a four-sided shoulder having a flat top 13 or a four-sided shoulder having tapered top that tapers to a flat edge 15. The shoulders may also include a four sided shoulder having a nib 21, 22 formed at the top. The nib 21, 22 may be four-sided having a flat top 21 or four-sided having tapered top that tapers to a flat edge 22. Other shoulders design may become apparent from this disclosure.

The vehicle ramp 50 also has a number of rungs 56. These rungs 56 are having cubic dimensions measuring about ½ to 2 feet in length, 1 to 6 inches in height and ½ to 6 inches in width. Each rung 56 has a hollowed-out end portion called a notch 14 (shown in FIGS. 2a-d but for ease of explanation only FIG. 2a will be utilized). The notch 14 is designed to have an antithetical design to the shoulder 13.

During manufacture, the shoulders 13 and notches 14 are tightly fitted together thereby forming the ramp 50. To further ensure the ramp is structurally sound, holes 57 are drilled through the rungs 56 and shoulders 13. These holes 57 are aligned during manufacture and then fasteners 58 are secured through the holes 57. These fasteners 58 fixedly secure the rungs 56 to stiles 51-53.

Another feature that is included on the ramp is a ramp extension 54 with protrusions 55. These ramp protrusions 55 extend from the tip of the ramp extension 54. The protrusions 55 align with opening that are drilled into the truck bed (not shown). That is, during use, the ramp 50 is placed onto the truck bed with the protrusions 55 being inserted into the openings. These protrusions 55 are easier to use than the retention chains described above, even though, the retention chains may also be utilized in this embodiment. The ramp extensions 540 form the top part of the ramp 30 and make contact with the vehicle thereby providing a seamless transition for items that are rolled onto and off of the vehicle.

The user can easily store the ramp 50 within a vehicle and the ramp may be put into a working position quickly and easily. For example, when the ramp 50 is needed, the user will take the ramp 50 out of its stored position and then align the protrusions 55 with the openings on the truck bed and lay the ramp 50 down. The ramp 50 is now in position for use and a user may roll items along the ramp 50 or the user may carefully walk along the ramp 50 and put items in the bed of the truck. The unfoldable ramp 50 with protrusions 55 is ideal for transport of items that are unloaded frequently such as commercial lawn mowers.

Although the present invention has been described in detail and with particularity, it will be appreciated by those skilled in this art that changes and modifications can be made therein without departing from the scope and spirit of the invention.

What is claimed:

1. A ramp comprising:
   at least two end stiles, each end stile having a top, a bottom and four sides;
   at least one middle stile, each middle stile having a top, a bottom and four sides;
   a plurality of shoulders, the shoulders being equally spaced apart and integrally formed on one side of each end stile and two sides of the middle stiles, the plurality of shoulders each having a solid body;
   a plurality of solid rungs, each rung having a right end, a left end and four sides; and
   a plurality of notches, the notches being located on the right end and left end of each rung, the number of shoulders equaling the number of the notches,
   whereby the notches have an opposite design to that of the shoulders and, due to the opposite design, the shoulders and notches are tightly fitted together to form the ramp.

2. The ramp as claimed in claim 1 further comprising:
   a ramp extension connecting to the top of each stile.

3. The ramp as claimed in claim 1 whereby the shoulders are four-sided having a flat top.

4. The ramp as claimed in claim 1 whereby the shoulders are four-sided shoulder having tapered top.

5. The ramp as claimed in claim 3 whereby the shoulders include a nib.

6. The ramp as claimed in claim 1 further comprising:
   at least two retention chains for removably attaching the ramp to a vehicle.

7. The ramp as claimed in claim 1 further comprising:
   support fasteners for fixedly holding the rungs and the stiles together.

* * * * *